Sept. 12, 1944.　　　R. H. WHISLER, JR　　　2,357,920
SHOCK ABSORBER
Filed Oct. 11, 1943　　　2 Sheets-Sheet 1

INVENTOR.
RALPH H. WHISLER JR.
BY
Whittemore, Hulbert & Belknap
ATTORNEYS

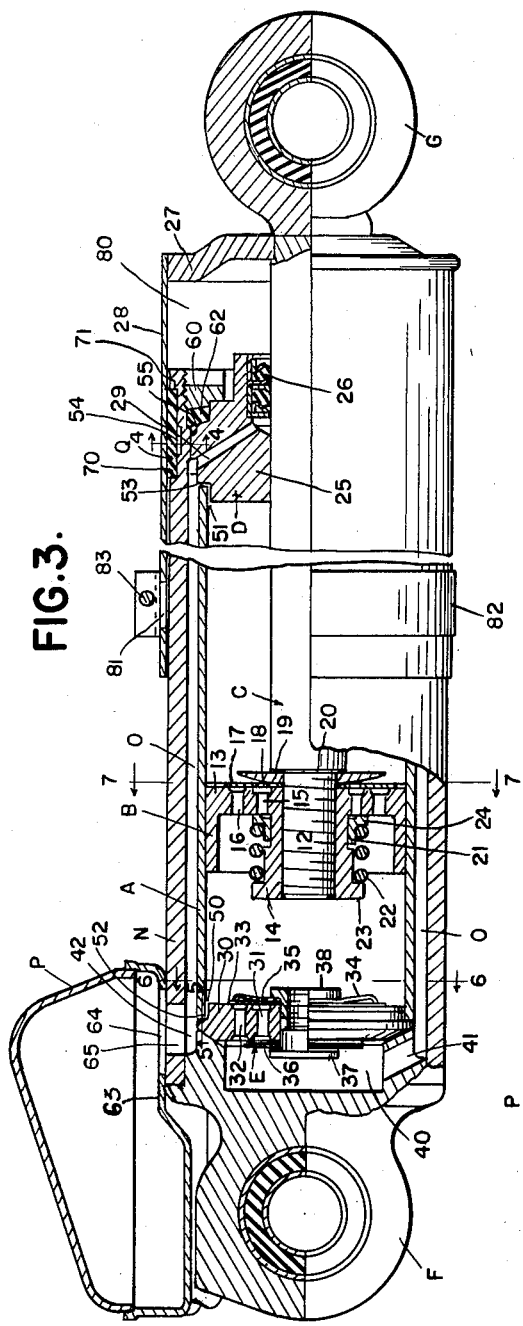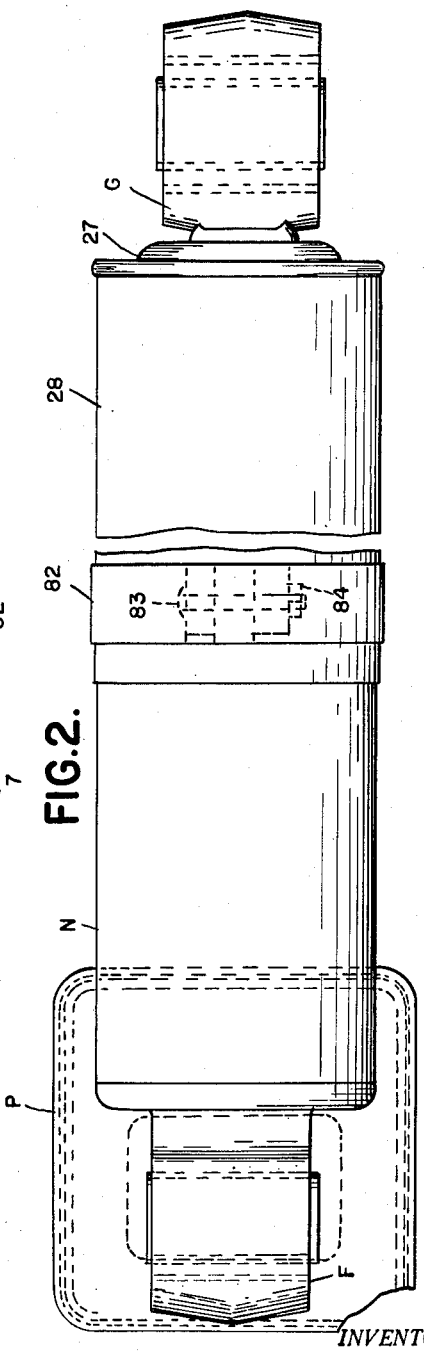

Patented Sept. 12, 1944

2,357,920

UNITED STATES PATENT OFFICE 2,357,920

SHOCK ABSORBER

Ralph H. Whisler, Jr., Monroe, Mich., assignor to Monroe Auto Equipment Company, Monroe, Mich., a corporation of Michigan Application October 11, 1943, Serial No. 505,849

12 Claims. (Cl. 188—88)

This invention relates generally to shock absorbers and refers more particularly to hydraulic shock absorbers of the direct acting type.

One of the essential objects of the invention is to provide a shock absorber of the type mentioned capable of being installed in a substantially horizontal position upon Army tanks, tractors and the like, to stabilize the action of relatively movable parts of the endless track structure thereof. More specifically, it is an object to provide a hydraulic shock absorber adapted to be located between and terminally connected to upstanding arms of supporting bell crank levers for the boggie wheels of endless track structure of tanks and the like.

In devices of this type it is important that the reserve chamber for the hydraulic medium have sufficient capacity to take care of the hydraulic medium under all conditions of operation. Therefore, another object is to provide a shock absorber wherein an auxiliary chamber, preferably in the form of a dome, is mounted upon and in open communication with the reserve chamber so as to form an elevated part thereof capable of maintaining the level of hydraulic medium at the proper height relative to the valves and other essential parts of the shock absorber.

Another object is to provide a shock absorber wherein bleed notches or grooves for air are provided at longitudinally spaced points of the pressure cylinder at the top thereof so that air may escape to the reserve chamber during both the compression and rebound strokes of the piston.

When assembling the parts of the shock absorber it is essential for proper operation purposes that the air bleed notches or grooves be located in longitudinal alignment at the top of the pressure cylinder. Therefore, another object of the invention is to provide the bleed notches in the body of the compression valve assembly and in the body of the piston rod guide at opposite ends of the pressure cylinder, and to provide means, preferably in the form of a spline and groove connection, between the body of the piston rod guide and the shock absorber casing to insure proper relationship of the parts during assembly thereof.

Another object is to provide an improved dirt shield and seal assembly for excluding dirt from the interior of the shock absorber while permitting relative movement between the parts thereof.

Another object is to provide a shock absorber that is simple in construction, economical to manufacture, easy to install and efficient in operation.

Other objects, advantages and novel details of construction of this invention will be made more apparent as this description proceeds, especially when considered in connection with the accompanying drawings, wherein:

Figure 2 is a fragmentary plan view of the shock absorber;

Figure 3 is a fragmentary elevational view, with parts broken away and in section.

Figure 1:
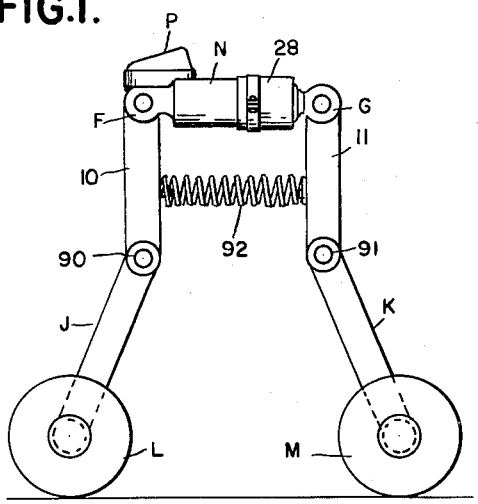
Figure 1 is a fragmentary diagrammatic view of an endless track structure of an Army tank, and showing a shock absorber embodying my invention between and terminally connected to the upstanding arms of supporting bell cranks for the boggie wheels.
Figure 7:
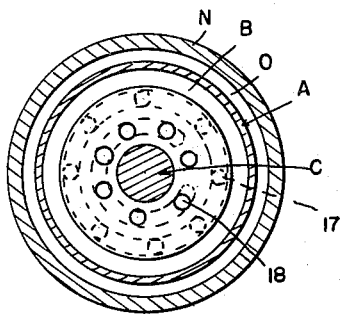
Figure 6:
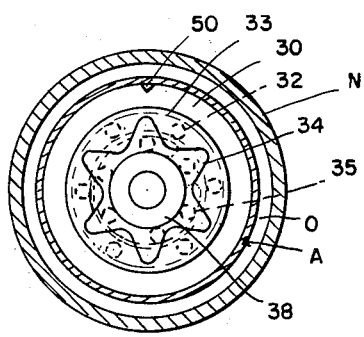
Figure 5:
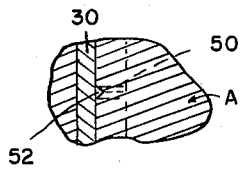
Figure 5 is a sectional view taken substantially on the line 5—5 of Figure 3.
Figure 4:
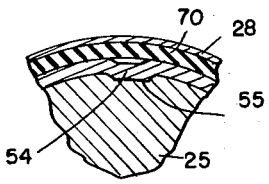
Figure 4 is a sectional view taken substantially on the line 4—4 of Figure 3.

Fiugre 6 is a sectional view taken substantially on the line 6—6 of Figure 3; and Figure 7 is a sectional view taken substantially on the line 7—7 of Figure 3.

Referring now to the drawings, A is a pressure cylinder, B is a reciprocating piston in said cylinder, C is an actuating rod for the piston, D is a combined closure for one end of the cylinder and a guide for the rod, E is a compression valve assembly at the other end of the cylinder, F and G respectively are apertured attaching heads rigid with respect to the compression valve assembly E and rod C and adapted to be connected to the upstanding arms 10 and 11 respectively of supporting bell crank levers J and K for the boggie wheels L and M of an endless track structure of an Army tank, N is a tubular casing member concentric with the pressure cylinder A and cooperating therewith and with the head F and closure D to form a reserve chamber O, P is an auxiliary chamber on top of and rigid with the head F and casing member N, and Q is a dirt shield and seal assembly of a shock absorber embodying my invention.

As shown, the piston B is mounted on the reduced inner end portion 12 of the rod and slidably engages the inner walls of the pressure cylinder A. The head 13 of the piston is held on the rod by a sleeve type nut 14 threadedly engaging the reduced portion 12 of the rod, and has inner and outer passages 15 and 16 respectively therethrough for hydraulic medium in the cylinder. A flexible disc valve 17 on the rod controls the flow of hydraulic medium through the outer series of passages 16 on the compression stroke of the piston and has suitable openings 18 registering with the inner series of passages 15. A backer plate 19 for the valve 17 is on the rod between a shoulder 20 thereof and the piston and permits limited flexing of the peripheral portion of the valve 17 to uncover the outer passage during the compression stroke of the piston. A valve 21 slidable on the sleeve type nut 14 controls the flow of hydraulic medium through the inner series of passages 15 on the rebound stroke of the piston and is normally held in closed position by means of a coil spring 22 engaging lateral flanges 23 and 24 respectively of said nut and valve.

The piston rod C slidably engages the body 25 of the member D and a seal 26 within said body at the outer end thereof and carries adjacent the head G a cover plate 27 which cooperates with a tubular dirt shield 28 to form an enclosure for the member D and associated parts. Preferably the member D has one or more passages 29 for conducting to the reserve chamber O any hydraulic medium that may be scraped or wiped from the rod C by the seal 26.

The compression valve assembly E has a body 30 provided with inner and outer passages 31 and 32 respectively for hydraulic medium. A flexible disc valve 33 controls the flow of hydraulic medium through the outer passages 32 during the rebound stroke of the piston and is normally held in closed position by a substantially star shaped spring 34. This valve 33 has suitable openings 35 registering with the inner passages 31 to permit flow of hydraulic medium therethrough. A laminated spring valve 36 controls the flow of hydraulic medium through the inner passages 31 during the compression stroke of the piston. Any suitable means such as the bolt 37 and nut 38 carried by the body 30 of the assembly at the center thereof may be employed for holding the valves 33 and 36 and spring 34 in assembled relation.

The head F is rigidly secured to and constitutes an endwise extension of the tubular casing member N. Preferably this head is provided with a central recess 40 that is in communication with the passages 31 and 32 in the compression valve assembly and has one or more passages 41 that extend between the recess 40 and the reserve chamber O. In this connection it will be noted that the head F has a peripheral recess 42 that registers with and constitutes an endwise extension of the reserve chamber O.

The head G is welded or otherwise rigidly secured to the rod C at the outer end thereof. In the present instance, annular recesses 50 and 51 respectively are provided in the bodies 30 and 25 of the compression valve assembly and the piston rod guide for receiving opposite ends of the pressure cylinder A, and longitudinally aligned air bleed notches or grooves 52 and 53 respectively of substantially L cross section are provided in these recesses at the top of the cylinder A to permit air to escape from the interior of the cylinder to the reserve chamber O during the compression and rebound strokes of the piston.

In order that the air bleed notch 53 in the body 25 of the piston rod guide will be in proper alignment with the notch 52 in the compression valve assembly when the parts are assembled, the tubular casing member N has a longitudinally extending elongated inwardly pressed or indented portion 54 that serves as a spline for engagement with a correspondingly shaped groove 55 in the body 25 of the piston rod guide. Thus, when the guide D containing the bleed notch 53 is assembled with the cylinder A after the latter has been assembled with the body 30 of the compression valve assembly, it necessarily follows that the engagement of the groove 55 by the spline 54 will position the notch 53 at the top of the cylinder A in alignment with the notch 52 in the body 30 of the compression valve assembly and will effectively prevent relative turning movement between the casing N and guide D and between the latter and the cylinder A. Any suitable means such as the nut 60 threadedly engaging the casing N and having a flange 61 overlapping the guide D may be used to hold the parts in assembled relation, and any suitable means such as a packing 62 may be used between the guide D and nut 60 to provide a tight joint or seal.

The auxiliary chamber P is preferably in the form of a dome and is rigidly mounted on top of the head F and casing member N. Preferably the bottom 63 of this chamber has an opening 64 registering with an opening 65 in the casing member N so that hydraulic medium and air may flow from the reserve chamber O into the auxiliary chamber P. Thus, the hydraulic medium will fill the reserve chamber O and partially fill the auxiliary chamber P, while the air may collect in the top of the auxiliary chamber P above the level of hydraulic medium therein. As a result, the reserve chamber O and auxiliary chamber P collectively will have sufficient capacity to take care of the hydraulic medium under all conditions of operation.

The dirt shield and seal assembly Q is preferably provided over the spline 54 and groove 55 connection between the outer casing N and the piston rod guide D. As shown, the tubular dirt shield 28 is rigidly secured to the cover plate 27 on the piston rod and is spaced slightly from but concentric with the outer casing N. The sealing material 70 is preferably wadding of fabric or other suitable material that is received in an annular recess 71 in the exterior of the outer casing and that is sufficiently thick to extend outwardly beyond the edges of the recess for proper wiping engagement with the inner surface of the dirt shield 28. Thus, the wadding 70 covers the spline and groove connection mentioned and effectively prevents dirt from the outside entering the space 80 enclosed by the dirt shield 28 and cover plate 27.

To afford access to the space 80, and more particularly to the nut 60 when the piston rod C is pulled outward by the head G, the dirt shield 28 has one or more slots 81 normally over the outside of the casing member N and closed by a cover ring 82 clamped in position by a bolt 83 and nut 84.

In the process of construction, the compression valve assembly E as a unit is inserted into the outer casing N before the pressure cylinder A is inserted into said casing member. Such assembly E is positioned against the head F so that the notch 52 is in vertical alignment with the opening 65 in the casing member N. In fact, this opening 65 may be used as a sight opening for this purpose before the dome P is mounted upon the head F and casing member N. The pressure cylinder A may then be inserted into the casing member N to engage the annular recess 50 in the body 30 of the compression valve assembly. The piston B and rod C with the guide D upon the latter may then be inserted into the cylinder A so that the annular recess 51 in the guide will receive the other end of the cylinder A. However, as this is done the groove 55 in the guide is aligned with the spline 54 so as to receive the same upon insertion of the parts. Thus, the notch 53 in the guide will be aligned with the notch 52 in the body 30 of the compression valve assembly. The packing 62 and nut 60 may then be engaged with the casing member N and guide D. The dome P may then be mounted on the head F and casing member N, and the dirt shield 28 may be slipped upon the casing member and welded or otherwise fixed to the cover plate 27 on the rod C. Finally, the cover ring 82 may be mounted on the dirt shield 28 over the slot 81 therein to complete the assembly.

In use, the shock absorber is located in a substantially horizontal position between and is terminally connected to the upstanding arms 10 and 11 of supporting bell crank levers J and K for boggie wheels L and M of an endless track structure of an Army tank or the like. The bell crank levers J and K are pivoted at 90 and 91 to the tank or tractor and are normally held in proper position by a coil spring 92 extending between and terminally connected to the upright arms 10 and 11 thereof.

When the arms 10 and 11 of the bell crank levers are moved toward each other by the action of the boggie wheels L and M, the piston B within the hydraulic shock absorber will be on its compression stroke and will cause hydraulic medium in the cylinder A to flow through the outer passages 16 in the piston to open the valve 17 and will cause hydraulic medium in the cylinder to flow through the inner passages 31 in the body 30 of the compression valve assembly E to open the laminated spring valve 36 so that such hydraulic medium may flow to the reserve chamber O.

When the arms 10 and 11 of the bell crank levers are moved away from each other, the piston B of the shock absorber will be on the rebound stroke and will cause hydraulic medium in the reserve chamber O to flow through the outer passages 32 in the body 30 of the compression valve assembly E to open the valve 33 against tension of the star shaped spring 34, and will cause hydraulic medium in the cylinder A to flow through the inner passages 15 in the piston to open the valve 21 against the tension of the spring 22. Thus, the proper resistance in both directions will be properly afforded.

During the compression stroke, air in the cylinder A may escape through the notch 52 in the body 30 of the compression valve assembly to the reserve chamber O and thence through the registering openings 64 and 65 to the auxiliary chamber P. During the rebound stroke, air in the cylinder A may escape through the notch 53 in the body 25 of the piston rod guide D to the reserve chamber O and thence through the registering openings 64 and 65 to the auxiliary chamber P. Likewise, on the rebound stroke, oil scraped from the rod C by the seal 26 may flow through passage 29 to the reserve chamber O.

What I claim as my invention is:

1. A hydraulic shock absorber adapted for horizontal mounting and having substantially concentric pressure and reserve chambers, means assembled with the cylinder and providing at the top thereof substantially aligned air bleed orifices between said concentric chambers, and means for maintaining alignment of said orifices and preventing relative turning movement between said chambers.

2. A hydraulic shock absorber adapted for horizontal mounting and having substantially concentric pressure and reserve chambers, means assembled with the cylinder and providing at the top thereof substantially aligned air bleed orifices between said concentric chambers, and means including a spline and groove connection between a portion of one of said chambers and the last mentioned means for maintaining alignment of said orifices and preventing relative turning movement between said chambers.

3. A hydraulic shock absorber adapted for horizontal mounting and having substantially concentric pressure and reserve chambers, means assembled with the cylinder and providing at the top thereof substantially aligned air bleed orifices between said concentric chambers, and cooperating means carried respectively by a portion of one of said chambers and the last mentioned means for maintaining alignment of said orifices and preventing relative turning movement between said chambers.

4. A hydraulic shock absorber adapted for horizontal mounting and having a pressure tube, a tubular casing outside and concentric with said tube, a valve assembly at one end of the said tube and providing at the top thereof an air bleed orifice between the tube and casing, and a closure member for the tube providing at the top thereof substantially in alignment with the orifice aforesaid a second air bleed orifice between the tube and casing.

5. A hydraulic shock absorber adapted for horizontal mounting and having a pressure tube, a tubular casing outside and concentric with said tube, a valve assembly at one end of said tube and providing at the top thereof an air bleed orifice between the tube and casing, a closure member for the tube providing at the top thereof substantially in alignment with the orifice aforesaid a second air bleed orifice between the tube and casing, and means including a spline and groove connection between the casing and closure for maintaining alignment of said orifices and preventing relative turning movement between the tube and casing.

6. A hydraulic shock absorber adapted for horizontal mounting and having a pressure tube, a tubular casing outside and concentric with said tube, a valve assembly at one end of said tube and providing at the top thereof an air bleed orifice between the tube and casing, a closure member for the tube providing at the top thereof substantially in alignment with the orifice aforesaid a second air bleed orifice between the tube and casing, and means projecting from the casing and engaging the closure to maintain alignment of the orifices and to prevent relative turning movement between the tube and casing.

7. A hydraulic shock absorber adapted for horizontal mounting and having a reserve chamber provided at the top thereof with an opening, an attaching head secured to and projecting endwise from said chamber, and an auxiliary chamber mounted on said head and chamber and having an opening registering with the opening aforesaid.

8. A hydraulic shock absorber having a substantially horizontal reserve chamber, the top wall of said chamber having an opening, an attaching head secured to said chamber, and a dome covering and in open communication with said opening, said dome being mounted upon and secured to said head and chamber.

9. A hydraulic shock absorber having a substantially horizontal reserve chamber, the top wall of said chamber having an opening, an attaching head secured to said chamber, and a closed receptacle mounted on top of the head and chamber and having an opening registering with the opening aforesaid, whereby said receptacle may function as an elevated auxiliary chamber for the reserve chamber.

10. A hydraulic shock absorber having a pressure cylinder, closures for opposite ends of said cylinder, said closures extending within said cylinder and having annular recesses receiving opposite ends of said cylinder, the walls of said recesses having substantially aligned bleed notches therein to permit escape of air from the interior of the cylinder, a tube outside and substantially concentric with said cylinder adapted to receive the escaped air, and means engaging said tube and one of said closures for maintaining the bleed notches substantially in alignment with each other.

11. A hydraulic shock absorber having a pressure cylinder, a closure for one end of said cylinder having means cooperating with the cylinder to provide a bleed passage through which air may escape from the interior of the cylinder, a closure for the other end of the cylinder having means cooperating with the cylinder to provide a bleed passage through which air may escape from the interior of the cylinder, one of said closures and said cylinder having cooperating means for positioning said one closure in a predetermined relation to the cylinder and to the other closure, whereby the bleed passages in both of said closures will be maintained in a predetermined relation to each other.

12. A hydraulic shock absorber having a pressure cylinder, a closure for one end of said cylinder, said cylinder and closure having a spline and groove connection, the cylinder being provided upon the outer side of said spline and groove connection with a recess, and sealing material within said recess and covering the spline and groove connection.

RALPH H. WHISLER, Jr.